Patented Nov. 3, 1931

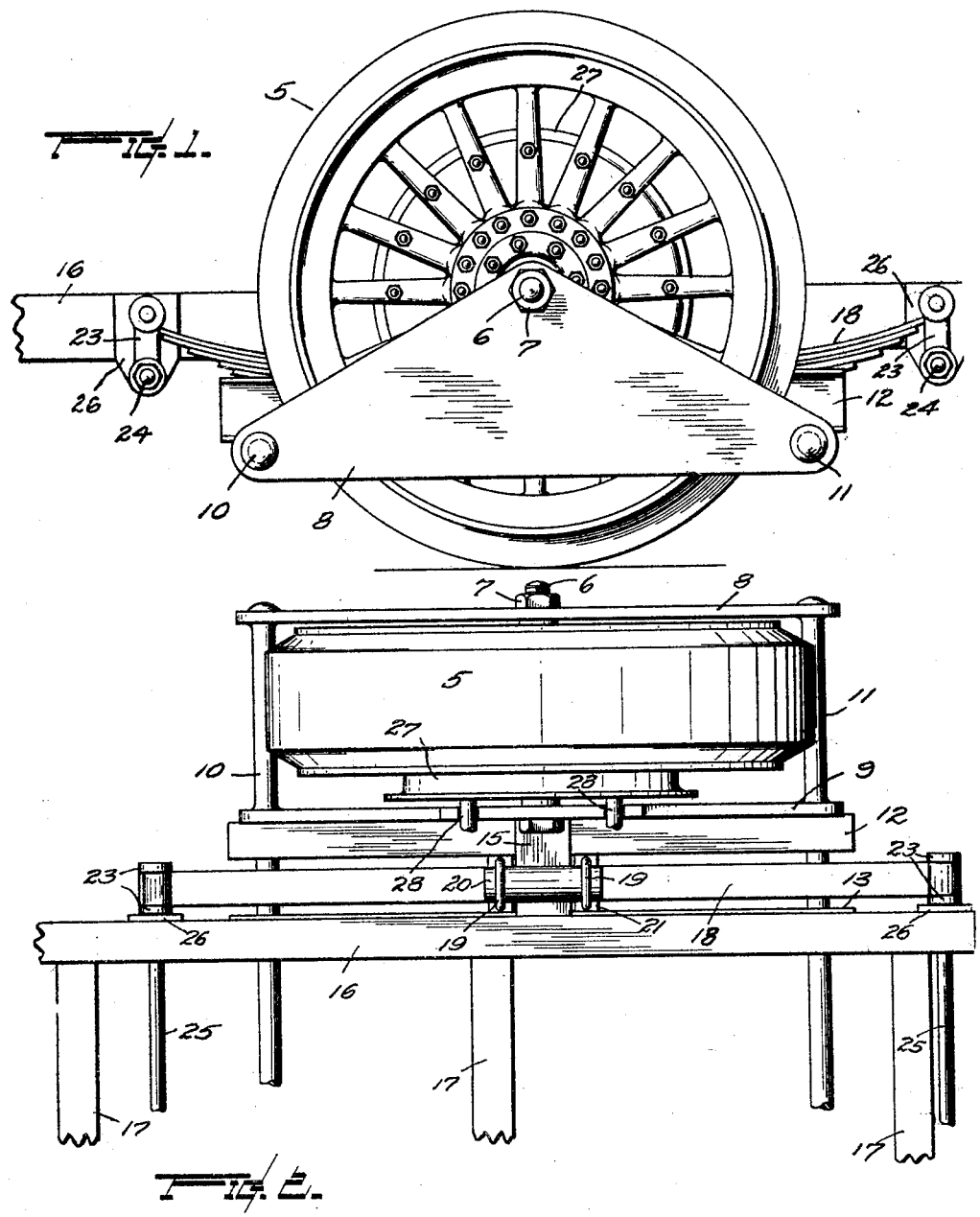
Nov. 3, 1931.  S. G. BARNARD  1,830,048
WHEELED VEHICLE
Filed June 26, 1929   2 Sheets-Sheet 1
INVENTOR
Samuel G. Barnard
BY
ATTORNEY

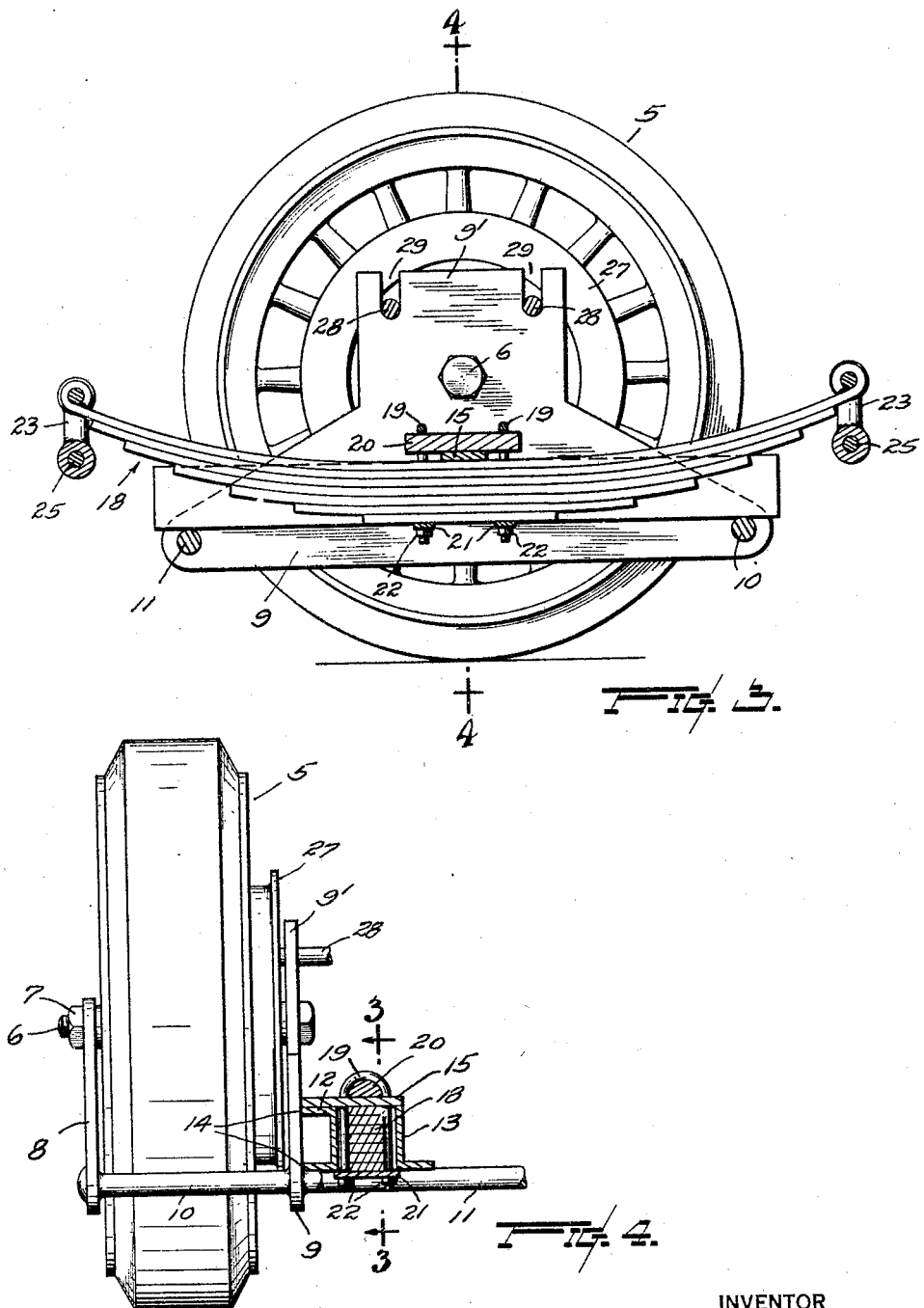

1,830,048

UNITED STATES PATENT OFFICE

SAMUEL G. BARNARD, OF SEATTLE, WASHINGTON

WHEELED VEHICLE

Application filed June 26, 1929. Serial No. 373,729.

This invention relates to the running gear of wheeled vehicles and, more especially, to the axle and body supporting devices for trucks, trailers and other load carrying vehicles.

The object of the invention is to provide strong, durable, and efficient devices of this character.

More specific objects and advantages of the invention will appear in the following description.

The invention consists in the novel construction, adaptation and combination of parts hereinafter described and claimed.

In the accompanying drawings,—

Figure 1 is a side elevation of the rear end of a wheeled vehicle embodying my invention; Fig. 2 is a plan view of parts shown in Fig. 1 pertaining to one side of the vehicle; Fig. 3 is a longitudinal sectional view taken substantially through 3—3 of Fig. 4; and Fig. 4 is a view partly in front elevation and partly in transverse section, said section being taken on line 4—4 of Fig. 3.

In said drawings, the reference numeral 5 represents a vehicle wheel rotatably mounted upon a spindle 6 which is detachably secured, as by means of a nut 7 engaging a screw threaded end of the spindle, to the upper portions of vertically disposed hanger plates 8 and 9 disposed at opposite sides, respectively, of the wheel.

Said plates are rigidly secured, as by welding to transversely arranged bars 10 and 11 provided in front and to the rear, respectively, of the wheel. These bars also serve to connect said hanger plates with corresponding hanger plates for a companion wheel (not shown) provided at the opposite side of the vehicle.

12 and 13 represent longitudinal bars which are mounted in spaced apart relation upon and rigidly secured, as by welding, to said transverse bars. The bar 12 is advantageously of the type known as a channel bar having two flanges which are welded as at 14 (Fig. 3) to the hanger plate 2. The other longitudinal bar 13 is advantageously an angle bar, as shown in Fig. 4.

15 represents a cap piece superposed upon and welded to both of the longitudinal bars 12 and 13 and constituting therewith and with the transverse bars 10, 11, and with the hangers 8 and 9, a rigid frame. This frame, hereinafter termed the underbody frame, is carried by the vehicle wheels which, in turn, carries the vehicle body, of which I show in Figs. 1 and 2 a portion of the floor frame composed of longitudinal and transverse beam elements 16 and 17. The vehicle body is supported at its opposite sides by means of springs 18, herein illustrated as laminated carriage springs, extending longitudinally of the vehicle in a space provided therefor between the bars 12 and 13, the spring being suspended and secured centrally of its length to the underside of the cap piece 15.

Said spring is secured by means, preferably, of clevises 19 disposed at opposite sides of the cap piece and straddles a bolster 20 which is seated upon the cap piece 15, the bifurcations of the clevises extend through an anchor plate or plates 21 held against the undersides of the bars 12 and 13 by means of nuts 22 engaging the respective clevises.

The spring 18, thus secured centrally of its length to the under frame, is connected at its ends through the medium of links 23 with the ends 24 of transverse rods 25 protruding laterally from bracket supports 26 which are secured to the respective longitudinal beam member 16 of the vehicle body.

27 represents a drum rigid with the wheel 5 and containing brake mechanism (not shown) of suitable known construction; the brake shoes being controlled by arms 28 for which guiding slots 29 (Fig. 3) are provided in an upwardly directed extension 9' of the inner hanger 9, thereby permitting vertical movement of a vehicle wheel 5 and the brake devices with respect to the underframe, for disassembling subsequent to the removal of the axle spindle 6.

In the use of my invention, the under frame—to which the wheels are rotatably connected—is a rigid structure, and yieldably supports the body frame for up and down movements by means of the springs 18, one for each wheel.

By positioning the springs in channels between the longitudinal bars 12 and 13, the latter prevents side swaying movement to the vehicle body.

While I have illustrated and described the embodiment of the invention now preferred by me I do not wish to be understood as confining the invention thereto and except as I may be limited by the following claims.

What I claim, is,—

1. In a vehicle, the combination with the vehicle wheels, axle spindles therefor, and a vehicle-body frame, of an under frame comprising hanger plate members depending from said spindles at opposite sides of the respective wheels, transversely arranged bars rigidly connected to the hanger plates in front of and to the rear of the wheels at opposite sides of the vehicle, a pair of horizontally spaced apart longitudinally disposed bars secured to said transverse bars and to the inner of said hanger plates at each side of the vehicle, and a cap piece coupling each pair of longitudinal bars centrally of its lengths, springs interposed between the complementary longitudinal bars of each pair thereof, means for securing the springs at their midlengths to the respective cap piece, and means connecting the ends of the springs to said body for supporting the same.

2. In a wheeled vehicle, the combination with a vehicle body frame, and a rigid underframe adapted to support said body frame for a low bed structure, said underframe comprising pairs of complementary spaced apart longitudinal bar members disposed at opposite sides of the vehicle, said longitudinal members having springs connected thereto and to the bed frame for supporting the latter, of means for mounting said underframe to the axle spindles of the vehicle wheels, said means comprising hanger members depending from said axle spindles, and transverse bar members secured to said hanger members to locate the same in front of and to the rear of the vehicle wheels and below the horizontal plane of the axle spindles, said transverse bar members affording a seat for the engagement thereover of said longitudinal bar members.

3. In a wheeled vehicle, the combination with a vehicle body frame, and an underframe comprising pairs of spaced apart longitudinal bar members disposed at opposite sides of the vehicle, said bar members and the body frame having springs interposed therebetween for connecting said bars to the body frame to support the latter for a low bed structure, of means for mounting said underframe to the axle spindles of the vehicle wheels, said means comprising hanger members depending from said axle spindles, and transverse bar members secured to said hanger members to locate the same in front of and to the rear of the vehicle wheels and below the horizontal plane of the axle spindles, said transverse bar members affording a seat for the engagement thereover of said longitudinal bar members.

4. In a wheeled vehicle, a vehicle body frame, and a rigid underframe therefor, said underframe and body frame having springs connecting one to the other to support the latter for a low bed structure, said underframe comprising transverse bar members disposed in front of and to the rear of the vehicle wheels, and hanger members depending from the axle spindles of the vehicle wheel for supporting said bar members, said hanger members being so configured as to position said bar members below the horizontal plane of the axle spindles.

5. In a wheeled vehicle, a vehicle body frame, an underframe, and means connecting said body frame and the underframe one to the other to support said body frame for a low bed structure, said underframe comprising transversely arranged bar members disposed in front of and to the rear of the vehicle wheels, and hanger members depending from the axle spindles of the vehicle wheels at oppositional sides of the wheels for supporting said bar members, said hanger members being of a configuration to position said bar members below the horizontal plane of the axle spindles.

6. In a wheeled vehicle, a vehicle body frame, an underframe, and means connecting said body frame and the underframe one to the other to support said body frame for a low bed structure, said underframe comprising transversely arranged bar members disposed in front of and to the rear of the vehicle wheels, and hanger members depending from the axle spindles of the vehicle wheels for supporting said bar members, said hanger members being of a configuration to position said bar members below the horizontal plane of the axle spindles.

Signed at Seattle, Washington, this 7th day of June, 1929.

SAMUEL G. BARNARD.